United States Patent
Gresset et al.

(10) Patent No.: US 11,234,374 B2
(45) Date of Patent: Feb. 1, 2022

(54) WRAPPING DEVICE, BLOCKING DEVICE, BALER AND METHOD FOR ADJUSTMENT OF A BALER TO A WRAPPING MATERIAL

(71) Applicant: DEERE & COMPANY, Moline, IL (US)

(72) Inventors: Pascal Gresset, Auxon Dessous (FR); Frederic Perrotin, Le Tremblois (FR)

(73) Assignee: DEERE & COMPANY, Moline, IL (US)

( * ) Notice: Subject to any disclaimer, the term of this patent is extended or adjusted under 35 U.S.C. 154(b) by 278 days.

(21) Appl. No.: 16/011,680

(22) Filed: Jun. 19, 2018

(65) Prior Publication Data

US 2018/0368327 A1 Dec. 27, 2018

(30) Foreign Application Priority Data

Jun. 27, 2017 (DE) .......................... 102017210813.4

(51) Int. Cl.
*A01F 15/07* (2006.01)
*A01F 15/08* (2006.01)

(52) U.S. Cl.
CPC ........ *A01F 15/0715* (2013.01); *A01F 15/085* (2013.01); *A01F 2015/072* (2013.01); *A01F 2015/0745* (2013.01); *A01F 2015/0755* (2013.01)

(58) Field of Classification Search
CPC .................. A01F 15/072; A01F 15/085; A01F 2015/072; A01F 2015/0745; A01F 2015/0755; B65B 41/12; B65B 61/02
USPC .......................................... 53/389.3, 556, 588
See application file for complete search history.

(56) References Cited

U.S. PATENT DOCUMENTS

| | | | | |
|---|---|---|---|---|
| 2,468,641 | A | * | 4/1949 | Scranton ............... A01F 15/141 100/5 |
| 3,781,988 | A | * | 1/1974 | Jones ..................... B26B 29/02 30/2 |
| 4,563,854 | A | * | 1/1986 | Ackermann ........ A01F 15/0715 53/118 |
| 4,768,431 | A | * | 9/1988 | Merritt, III ......... A01F 15/0715 100/15 |
| 4,802,395 | A | * | 2/1989 | Merritt, III ......... A01F 15/0715 56/341 |

(Continued)

FOREIGN PATENT DOCUMENTS

| | | |
|---|---|---|
| DE | 3330757 A1 | 2/1985 |
| DE | 3617155 A1 | 11/1987 |

(Continued)

OTHER PUBLICATIONS

European Search Report issued in counterpart application No. 18170522.9 dated Nov. 28, 2018. (7 pages).

(Continued)

*Primary Examiner* — Thanh K Truong
*Assistant Examiner* — David G Shutty (57) ABSTRACT

A wrapping device for wrapping a bale with a wrapping material for a baler includes a separating device having a knife arrangement and a blocking device. The separating device is movable between at least one wrapping means separating position and an inactive position. The blocking device prevents the separating device from being moved into the wrapping means separating position.

12 Claims, 5 Drawing Sheets

(56) References Cited

U.S. PATENT DOCUMENTS

| | | | | | |
|---|---|---|---|---|---|
| 5,231,828 | A | * | 8/1993 | Swearingen | A01F 15/0715 100/5 |
| 5,557,906 | A | * | 9/1996 | Viaud | A01F 15/0715 53/118 |
| 6,116,010 | A | * | 9/2000 | Salley | A01D 34/17 56/257 |
| 6,128,995 | A | * | 10/2000 | Geng | A01D 90/04 56/341 |
| 7,784,400 | B2 | * | 8/2010 | Simmons | A01F 15/0715 100/87 |
| 7,918,072 | B2 | * | 4/2011 | McClure | A01F 15/0715 53/465 |
| 2006/0242931 | A1 | * | 11/2006 | Ryse | A01F 15/0715 53/587 |
| 2010/0162676 | A1 | * | 7/2010 | Simmons | A01F 15/0715 56/341 |
| 2018/0354144 | A1 | * | 12/2018 | LeBlanc | B25G 1/08 |

FOREIGN PATENT DOCUMENTS

| | | |
|---|---|---|
| DE | 102005055375 A1 | 5/2007 |
| DE | 102009010547 B3 | 6/2010 |

OTHER PUBLICATIONS

German Search Report issued in counterpart application No. 102017210813.4 dated Feb. 9, 2018. (10 pages).

\* cited by examiner

WRAPPING DEVICE, BLOCKING DEVICE, BALER AND METHOD FOR ADJUSTMENT OF A BALER TO A WRAPPING MATERIAL

RELATED APPLICATIONS

This application claims priority to German Patent Application Ser. No. 102017210813.4, filed Jun. 27, 2017, the disclosure of which is hereby incorporated by reference in its entirety.

FIELD OF THE DISCLOSURE

The present disclosure relates to a wrapping device for wrapping a bale with a wrapping material for a baler, in particular an agricultural baler for the formation of round-cylindrical bales, with a separating device which has in particular a knife arrangement and can be moved between at least one wrapping means separating position and an inactive position, a blocking device, a baler, and a method for adjustment of a baler to a wrapping material.

BACKGROUND

Balers are known and used both in the agricultural and industrial sector. Corresponding agricultural presses serve, for example, to form crop bales in the manner of round bales, and often generate at least substantially round-cylindrical bales of crop, for example, in the form of straw, hay, forage, etc. Industrial presses are used in the compression of refuse, textiles or other materials or in pressing them into bales.

It is furthermore known to equip balers with a wrapping device, as a result of which a compressed bale is wrapped with a wrapping material and can subsequently be ejected in the wrapped form. The bale is shaped in a cylindrical bale pressing chamber of the baler during the bale formation phase. For this purpose, crop lying on the ground is conveyed by a crop collecting device into a bale pressing chamber and a cylindrical bale is formed by correspondingly arranged pressing means. The bale pressing chamber can be formed as a fixed pressing chamber, with cylindrically arranged pressing rollers, or also as a variable pressing chamber, with variable pressing means such as, for example, pressing belts or pressing chains.

In a wrapping material supply phase which follows on from the bale formation phase, a wrapping material is guided from a wrapping material roll in the direction of the bale which has been formed in the interim into the pressing chamber and carried along from the outside of the bale. Mesh, foil or yarn is used as the wrapping material. The wrapping material is guided around the bale in a wrapping phase by the rotating bale. The wrapping material is subsequently separated by a knife arrangement before the bale is ejected in the ball ejection phase or placed on the ground.

Wrapping materials are also supposed to be used which are formed in particular in such a manner that they have a nominal tearing point or a nominal tearing region and which thus make the use of a separating device in the manner of a knife arrangement superfluous or in the case of which a conventional knife arrangement can even hinder the wrapping process. This can in particular be disadvantageous if such a wrapping material is supposed to be used on a conventional baler which has a separating device since it can occur that the existing separating device hinders the wrapping process.

SUMMARY

In a first embodiment of the present disclosure, a wrapping device for wrapping a bale with a wrapping material for a baler includes a knife arrangement and can be moved between at least one wrapping means separating position and an inactive position, wherein at least one blocking device is provided which is suitable for preventing the separating device, i.e., mechanically, from occupying the wrapping means separating position. In this manner, an operation of the separating device can be prevented if this is not needed or could disturb an operation of the baler or the wrapping device. Fixing or blocking the separating device can be carried out, for example, by a mechanical stop, but it is also conceivable to block the separating device in a different manner, for example, by suppressing the supply of a hydraulic or pneumatic medium or fixing a drive. Such a wrapping device can be used on a baler, which may be an agricultural baler for the formation of round-cylindrical bales. It is, however, also conceivable that this involves an industrial press or a press for the production of square bales.

In particular, the blocking device fixes the separating device at least substantially in the inactive position or blocks it in this position. It is, however, also conceivable that the blocking device blocks or fixes the separating device in a position in which no separation of a wrapping material by the separating device is carried out or the separating device does not act on the wrapping material and which does not correspond to the inactive position as such.

In particular, the separating device has a drive, such as a piston/cylinder arrangement or interacts with such a drive, wherein the blocking device is suitable to fix or block the drive, in particular the piston or the cylinder of the piston/cylinder arrangement, in at least one position, such as an at least substantially retracted or extended position. The drive can be provided, for example, in order to pivot the separating device or the knife arrangement or move it in a translational manner. The drive can be, for example, an electric drive, in particular a servomotor, or any other suitable drive. It is, however, particularly expedient if the drive is formed in the manner of a hydraulically or pneumatically actuable piston/cylinder arrangement. It can be provided in a known manner that the separating device or the knife arrangement interacts in at least one position with the wrapping material in order to separate it or cut it off. The blocking device is, however, in particular suitable for fixing or blocking the drive in a position which corresponds at least substantially to the inactive position of the separating device. The blocking device is then suitable for fixing or blocking in particular the piston or the cylinder of the piston/cylinder arrangement in at least one position, such as a position which is at least substantially retracted or extended. The drive can, for example, be correspondingly actuated, in particular the blocking device interacts mechanically with the drive or acts mechanically thereon. Such a configuration is particularly simple in terms of design and reliable in its action.

It is particularly expedient if the blocking device has at least one pivot element. Such a pivot element can act, for example, as an in particular mechanical stop, in particular for the separating device or the knife arrangement or correspond to or act on the drive. The pivot element is fitted at one end pivotably about a pivot point on a housing of the separating device and is formed at the other end to interact with the separating device or the knife arrangement and in particular with the drive of the separating device.

If the pivot element is formed in such a manner that it can engage into the piston or engage around it, a movement of the piston of the piston/cylinder arrangement and thus of the separating device or the knife arrangement can be prevented in a simple manner.

If a spring means is provided which loads or pretensions the blocking device or the pivot element in the direction of an inactive position, in which the blocking device or the pivot element does not interact with the separating device, or an active position, in which the blocking device or the pivot element prevents the separating device from occupying the wrapping means separating position, the blocking device can be retained or secured by the spring means in its respective position. In particular the spring means are formed in the manner of a tension spring.

It is particularly advantageous if the spring means engages on the pivot element at a point of engagement located outside the pivot axis, in such a manner that the pivot point is arranged in the active position on one side of a line of action of the spring means and in the inactive position on the other side of the line of action. In this manner, the action of the spring means or a pre-tensioning exerted by the spring means on the blocking device or the pivot element must be overcome in order to be able to move or pivot the blocking device or the pivot element out of its active into its deactivated position or from its deactivated into its active position.

By means of a blocking device which is suitable for preventing a separating device of a wrapping device from occupying a wrapping means separating position, a wrapping device, known per se, for a baler, which is formed to separate or cut off a wrapping material at the end of a wrapping phase, can be refitted such that it is also suitable, for example, for use with wrapping materials which are not to be separated or cut at the end of a wrapping phase or in the case of which the use of a separating device may not be necessary or may be a hindrance.

It is particularly expedient to equip a baler, in particular an agricultural baler for the formation of round-cylindrical bales, with a wrapping device. In this manner, the baler can be operated both with conventional wrapping materials, for example, in the manner of mesh or foil, which are to be separated or cut off from the bale at the end of a wrapping phase, and used with wrapping materials which do not require separation/cutting off since they have, for example, a nominal tearing region or a nominal tearing point. The baler is in particular an agricultural baler for the formation of round-cylindrical balers. The press can, however, also be used in the industrial sector, for example, to form bales of paper, refuse, fabric or other materials. It is furthermore conceivable that this is a press for the production of square bales as is used both in the agricultural and industrial sector.

A baler can be adapted in a simple manner to different types of wrapping material by a method in the case of which the blocking device is transferred by an operator in particular manually and counter to loading by a spring means from an inactive position into an active position or from an active position into an inactive position.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
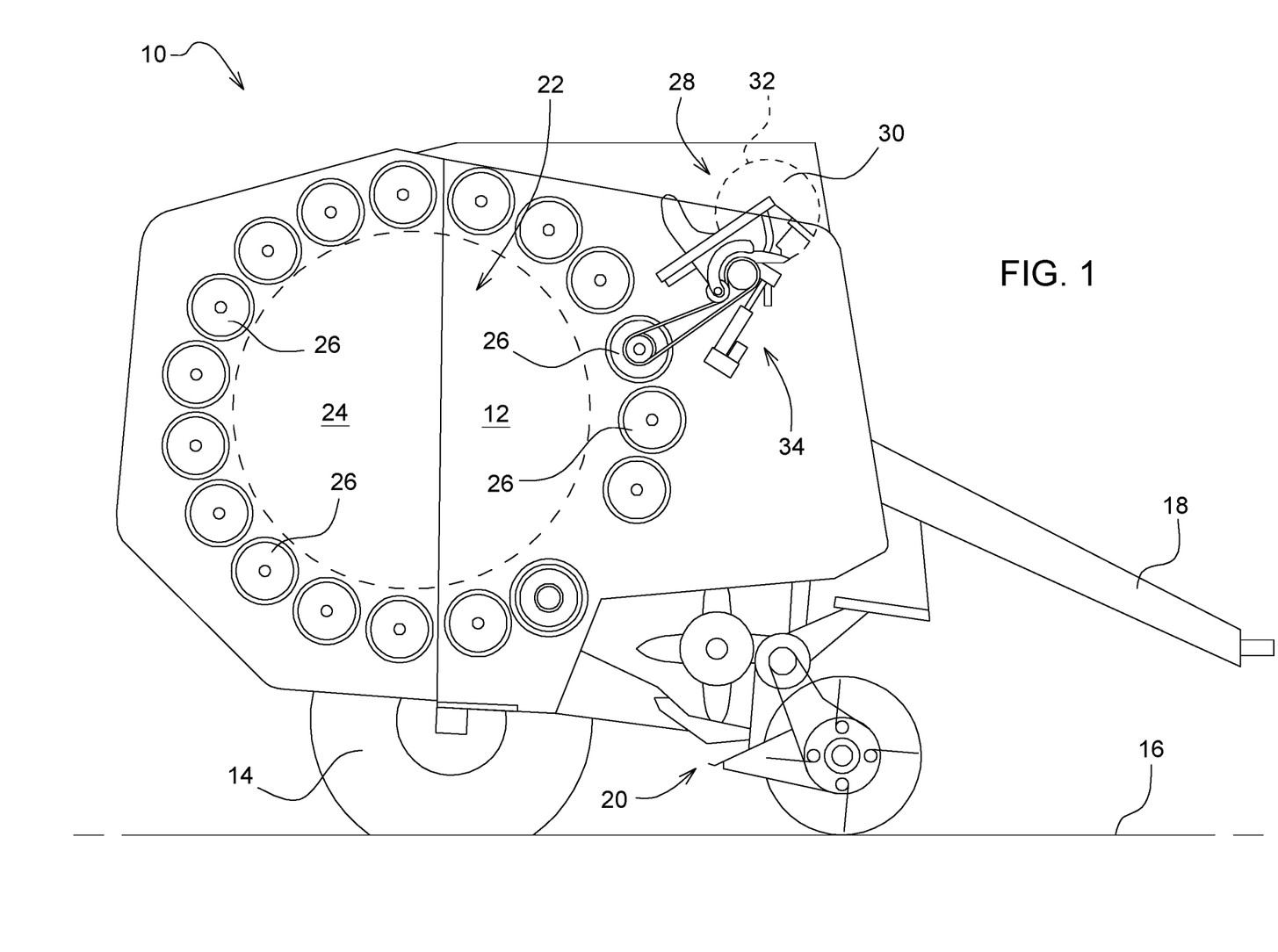
FIG. 1 is a schematic side view of a baler with a wrapping device.

A baler 10, represented schematically in FIG. 1, in the manner of an agricultural baler for the formation of round-cylindrical bales comprises a first housing part 12 which is supported by means of wheels 14 on a surface 16 and can be connected by means of a drawbar 18 to a drawing vehicle, not shown, e.g., a farm tractor.

A crop collecting device 20 for crop is located in a manner known per se on a lower side, to the front in the forward direction of travel, of first housing part 12, wherein first housing part 12 surrounds a front part of a bale pressing chamber 22. A bearing (not shown) for a pivotable second housing part 24, which surrounds a rear part of bale pressing chamber 22, is located at the rear upper corner region of first housing part 12. Second housing part 24, in the opened state (not shown), releases an outlet (not shown) through which a bale (not shown) pressed by baler 10 can be expelled or unloaded or ejected. Pivotable second housing part 24 can be activated (opened and closed) by means of servomotors (not shown) and thus represents an outlet flap for a bale pressed in bale pressing chamber 22.

Baler 10, which according to the representation in FIG. 1 is formed with a size-unchangeable baler pressing chamber 22, contains a plurality of pressing elements which run parallel to one another for pressing crop in the form of pressing rollers 26 (by way of example only a few pressing rollers 26 are provided with the reference number "26"), the axes of rotation of which, in the case of closed second housing part 24, are located on a circular arc and of which only a few are driven. Alternatively, baler 10 can also be formed in a familiar manner as such with a size-changeable bale pressing chamber 22 or as a baler 10 with a variable bale pressing chamber 22, wherein the pressing elements can then also be formed in a familiar manner as a strap, belt or chain arrangements (not shown).

Baler 10 further comprises a wrapping device 28 which is fitted with a wrapping material roll 30. Mesh, foil or also yarn can be used as wrapping material 32. Wrapping device 28 further comprises a supply device (not shown) for wrapping material 32 by means of which wrapping material 32 is guided from wrapping material roll 32 into bale pressing chamber 22.

Once the actual pressing process, therefore the crop collection and formation of a bale 10 by pressing rollers 26, has concluded, wrapping device 28 is activated and a wrapping process which follows on from the pressing process is initiated.

During the initiation of a wrapping process, in a wrapping material introduction phase, wrapping material 32 is guided in the direction of bale pressing chamber 22 by a mechanically triggered supply movement so that a free wrapping material end can come into contact with the bale which rotates in bale pressing chamber 22 and wrapping material 32 is carried along and collected. By rotation of the bale, wrapping material 32 is wound in a wrapping material winding phase in one or more layers around the circumference of the bale. The wrapping process is concluded with a wrapping material separating phase in which wrapping material 32 wound around the bales is separated from wrapping material roll 32 by a separating device 34.

Figure 2A:
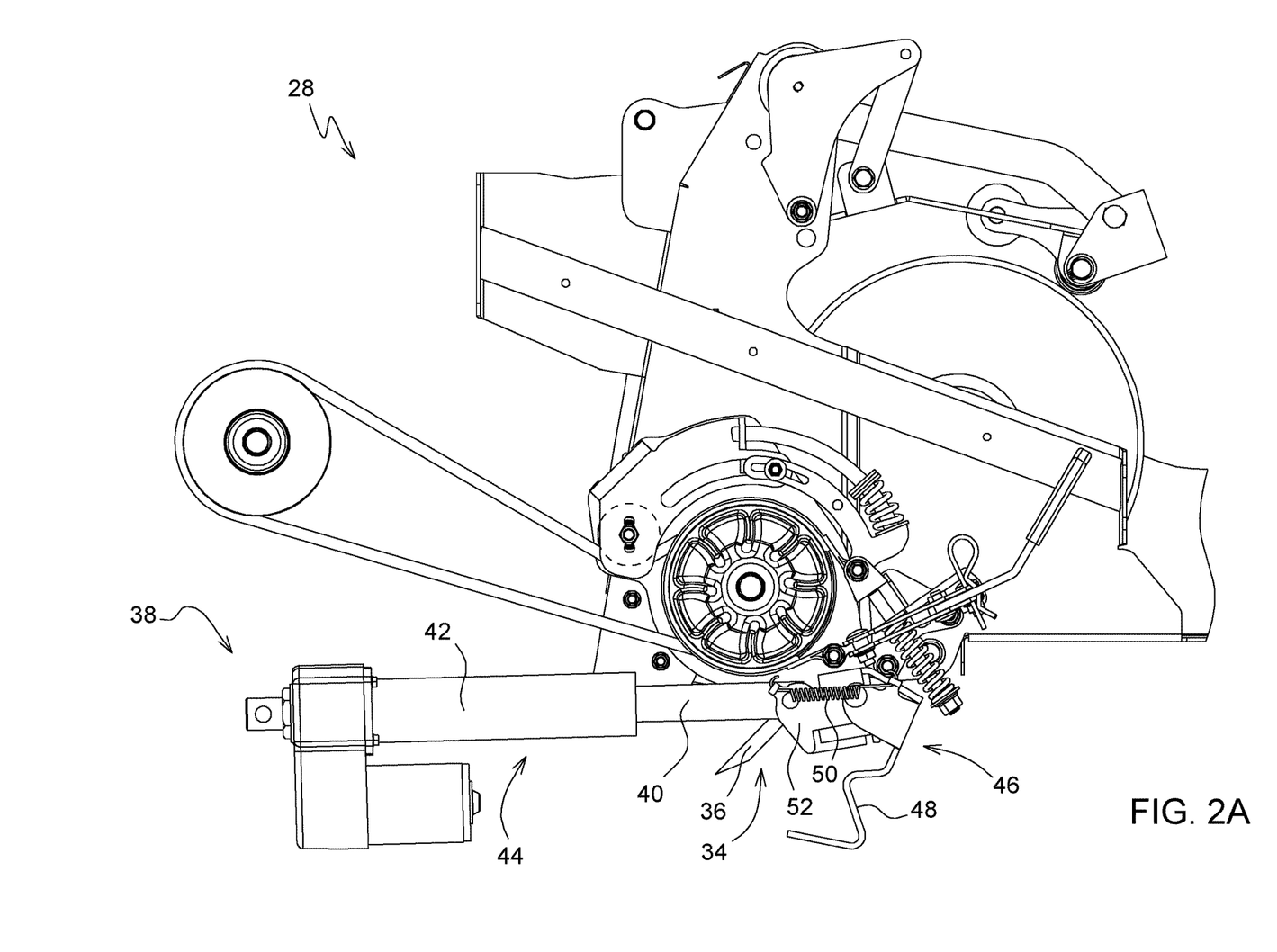
FIG. 2a is an enlarged schematic side view of the wrapping device of FIG. 1 with a separating device in an inactive position and a blocking device in a deactivated position.
Figure 2B:
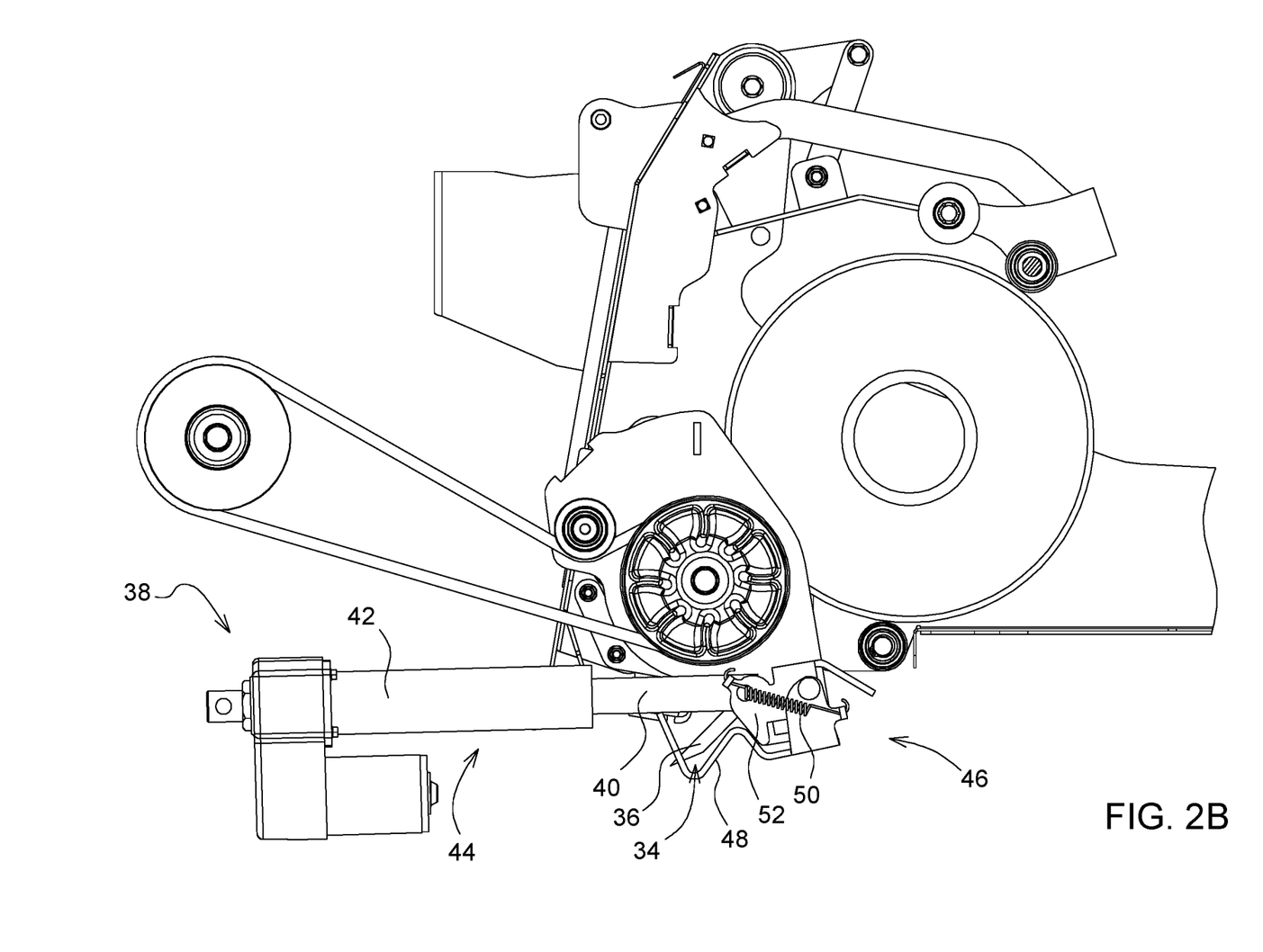
FIG. 2b is an enlarged schematic side view of FIG. 1 wherein the separating device is in the inactive position and the blocking device occupies an activated position.
Figure 2C:
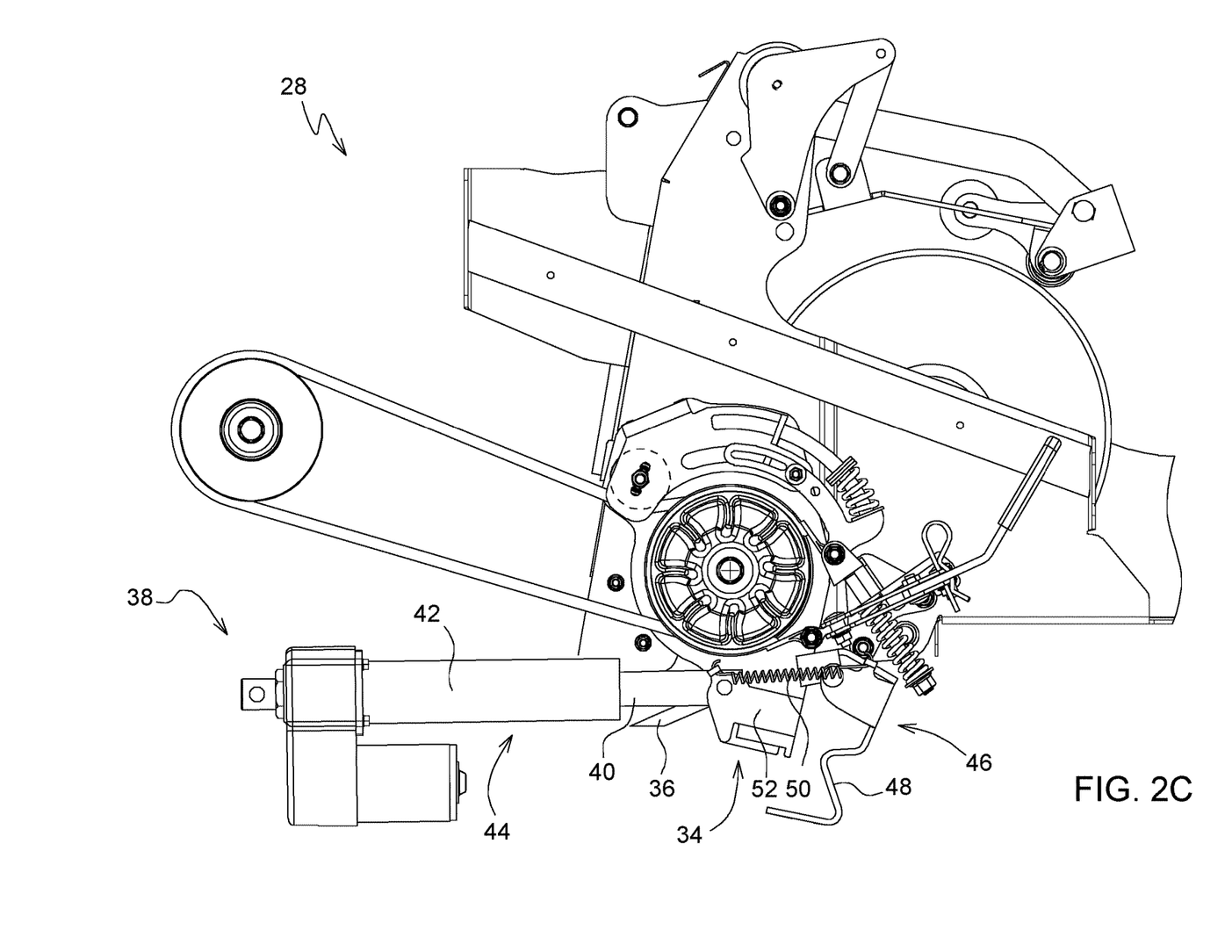
FIG. 2c is an enlarged schematic side view of the wrapping device of FIG. 1 with the separating device in a separating position and the blocking device in the deactivated position.

As shown in an enlarged form in FIGS. 2a, 2b, and 2c, separating device 34 has a knife arrangement 36 which supports the separation of wrapping material 32 in the wrapping material separating phase in which it cuts wrapping material 32 in a familiar manner in interaction with a counter holder, not represented. To this end, knife arrangement 36 can be moved with the aid of a drive 38, which is formed in the present embodiment in the manner of a piston/cylinder arrangement 44 which has a piston 40 and a cylinder 42, from an inactive position shown in FIGS. 2a and 2b into a separating position, shown in FIG. 2c. If piston 40 of the piston/cylinder arrangement 44 is retracted relative to cylinder 42 into it, knife arrangement 36 performs a pivoting movement, such as shown in FIG. 2c.

As represented in FIGS. 2a and b, wrapping device 28 furthermore has a blocking device 46 which can block or fix separating device 34 in its inactive position. Blocking device 46 has, according the present embodiment, a pivot element 48 as well as a spring means 50 formed as a tension spring. Pivot element 48 is provided pivotably on a frame 52 of separating device 34 about a pivot point 54 and is loaded by spring means 50 which engages at one end on a first fastening point 56 with frame 52 and at the other end on a second fastening point 58 on pivot element 48. Pivot element 48 is shown in a first, deactivated position A in FIG. 2a, in which position it does not interact with separating device 34 and in which it is retained by spring means 50 bearing with a stop 60 provided on frame 52. In FIG. 2b, however, pivot element 50 occupies a position B in which it fixes separating device 34 or knife arrangement 36 in the inactive position shown in the figures by virtue of the fact that it blocks a movement of piston 44 in relation to cylinder 44.

Figure 3A:
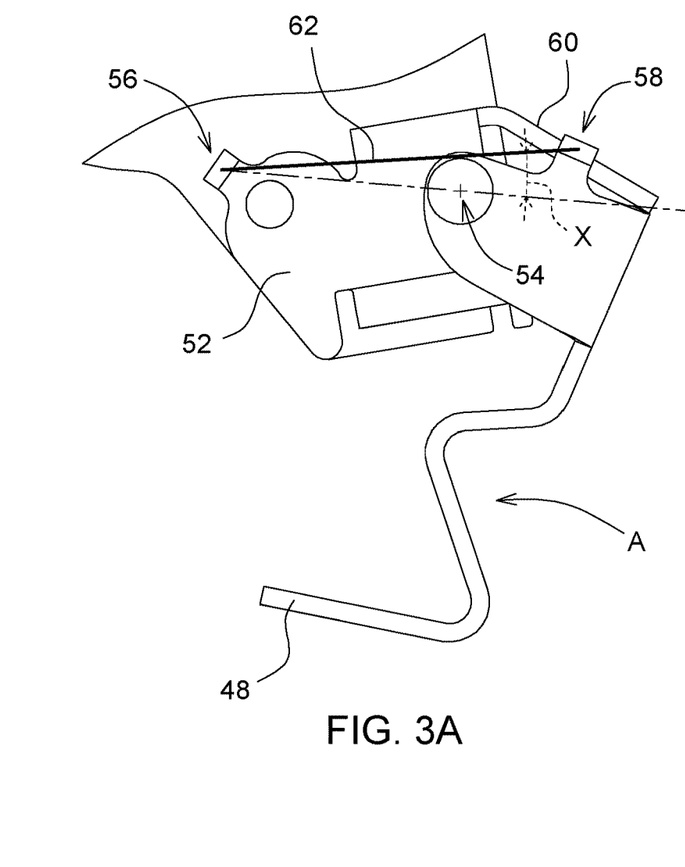
FIGS. 3a and 3b are an enlarged schematic side view of a pivot element from FIGS. 2a and 2b in order to illustrate corresponding lines of action of a spring element of the blocking device in the respective positions of the blocking device.
Figure 3B:
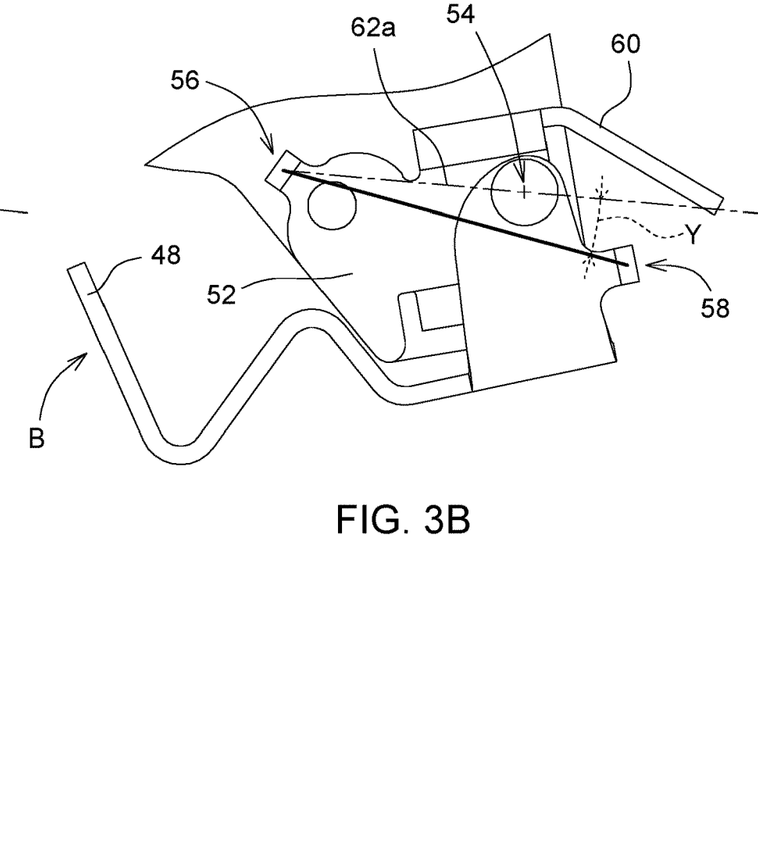

Reference is thus also made to FIGS. 3a and 3b of the drawing in which pivot element 48 is represented in an enlarged form and on the basis of which the mode of operation of spring means 50 is supposed to be described in greater detail. To this end, for the purpose of illustration, spring means 50 itself is not shown in the figures, but rather a line of action 62 of spring means 50.

Pivot element 48 occupies its deactivated position A in FIG. 3a. Spring means 50 formed according to the present embodiment as a tension spring thus loads pivot element 48 in such a manner that it comes to bear against stop 60. Pivot point 54 lies on one hand or according to the present embodiment below line of action 62 and has a first distance X thereto. Spring element 50 loads pivot element 48 in this position in a clockwise direction in the direction of stop 60.

In activated position B shown in FIG. 3b, pivot point 54 is thus on the other hand or according to the present embodiment above line of action 62 and has a distance Y opposite to distance X. In this position, spring means 50 thus loads pivot element 48 in the direction of a direction opposite to the representation in FIG. 3a in a clockwise direction and indeed in such a manner that it blocks piston 40 of piston/cylinder arrangement 44 in relation to cylinder 42 and separating device 34 is thus fixed in its inactive position shown in FIG. 2a.

In order to move pivot element 48 from its deactivated position A shown in FIG. 3a into active position B shown in FIG. 3b, pivot element 48 must reach via a dead center in which line of action 62 is extended through pivot point 54 or pivot point 54 is not spaced apart from line of action 62 (represented by an intermittent line 62a). To this end, a force must be applied from the outside on spring means 50 or pivot element 48. In the embodiment shown, pivot element 48 can be moved manually from the position shown in FIG. 2a counter to the action of spring means 50 into the position shown in FIG. 2b.

This is carried out in that an operator engages on pivot element 48 and transfers it against the action of spring means 50 from one position (A, B) into the other position (A, B), where it is retained securely by the action of spring means 50. It is, however, also conceivable that an operator engages indirectly on pivot element 48, for example, via a lever arrangement or a drive is provided with which pivot element 48 can be transferred from one into the other position (A, B) or by which, in addition or alternatively to spring means 50, it can be retained in its respective position (A, B).

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A wrapping device of a round baler for wrapping a bale with a wrapping material, the wrapping device comprising:
 a separating device having a frame and a knife arrangement, wherein the separating device is movable between a separating position and an inactive position;
 a pivot element pivotably mounted to the frame for rotational movement about a pivot point between a deactivated position disengaged from the separating device to allow movement of the separating device and an activated position engaged with the separating device to block movement of the separating device and fix the knife arrangement in the inactive position;
 wherein the separating device includes a piston and cylinder arrangement, and wherein the pivot element blocks movement of the piston when the pivot element is disposed in the activated position;
 a spring having a first end attached to the frame at a first fastening point and a second end attached to the pivot element at a second fastening point;
 wherein the spring is positioned on a first side of the pivot point when the pivot element is disposed in the deactivated position to bias the pivot element in a first rotational direction about the pivot point to maintain the pivot element in the deactivated position; and wherein the spring is positioned on a second side of the pivot point, opposite the first side of the pivot point, when the pivot element is disposed in the activated position, to bias the pivot element in a second rotational direction about the pivot point, opposite the first rotational direction, to maintain the pivot element in the activated position.

2. The wrapping device of claim 1, wherein the spring is a tension spring.

3. A baler for forming a bale, the baler comprising:
a first housing part and a second housing part cooperating to define a pressing chamber;
a separating device having a frame and a knife arrangement, wherein the separating device is movable between a separating position and an inactive position;
a pivot element pivotably mounted to the frame for rotational movement about a pivot point between a deactivated position disengaged from the separating device to allow movement of the separating device and an activated position engaged with the separating device to block movement of the separating device and fix the knife arrangement in the inactive position;
wherein the separating device includes a piston and cylinder arrangement, and wherein the pivot element blocks movement of the piston when the pivot element is disposed in the activated position; and
a spring attached to and interconnecting the frame and the pivot element, wherein the spring moves over center of the pivot point as the pivot element moves between the deactivated position and the activated position to bias the pivot element in a first rotational direction about the pivot point when the pivot element is disposed in the deactivated position, and to bias the pivot element in a second rotation direction about the pivot point, opposite the first rotational direction, when the pivot element is disposed in the activated position.

4. The baler of claim 3, wherein the spring is a tension spring.

5. The wrapping device of claim 1, wherein rotational movement of the pivot element about the pivot point between the deactivated position and the activated position moves the spring between the first side of the pivot point and the second side of the pivot point respectively.

6. The wrapping device of claim 1, wherein the frame includes a stop, with the pivot element biased against the stop by the spring when the pivot element is disposed in the deactivated position.

7. The wrapping device of claim 1, wherein the pivot point is positioned between the first end of the spring and the second end of the spring.

8. The baler of claim 3, wherein the spring includes a first end attached to the frame at a first fastening point and a second end attached to the pivot element at a second fastening point.

9. The baler of claim 8, wherein the pivot point is positioned between the first end of the spring and the second end of the spring.

10. The baler of claim 3, wherein the spring is positioned on a first side of the pivot point when the pivot element is disposed in the deactivated position to bias the pivot element in the first rotational direction about the pivot point to maintain the pivot element in the deactivated position; and
wherein the spring is positioned on a second side of the pivot point, opposite the first side of the pivot point, when the pivot element is disposed in the activated position, to bias the pivot element in the second rotational direction about the pivot point to maintain the pivot element in the activated position.

11. The baler of claim 10, wherein rotational movement of the pivot element about the pivot point between the deactivated position and the activated position moves the spring between the first side of the pivot point and the second side of the pivot point respectively.

12. The baler of claim 3, wherein the frame includes a stop, with the pivot element biased against the stop by the spring when the pivot element is disposed in the deactivated position.

* * * * *